(12) United States Patent
Kitagawa et al.

(10) Patent No.: US 10,274,307 B2
(45) Date of Patent: Apr. 30, 2019

(54) FILM THICKNESS MEASUREMENT DEVICE USING INTERFERENCE OF LIGHT AND FILM THICKNESS MEASUREMENT METHOD USING INTERFERENCE OF LIGHT

(71) Applicant: TORAY ENGINEERING CO., LTD., Chuo-ku, Tokyo (JP)

(72) Inventors: Katsuichi Kitagawa, Moriyama (JP); Masafumi Otsuki, Otsu (JP)

(73) Assignee: TORAY ENGINEERING CO., LTD., Tokyo (JP)

( * ) Notice: Subject to any disclaimer, the term of this patent is extended or adjusted under 35 U.S.C. 154(b) by 5 days.

(21) Appl. No.: 15/558,016

(22) PCT Filed: Feb. 17, 2016

(86) PCT No.: PCT/JP2016/054509
§ 371 (c)(1),
(2) Date: Sep. 13, 2017

(87) PCT Pub. No.: WO2016/147782
PCT Pub. Date: Sep. 22, 2016

(65) Prior Publication Data
US 2018/0045506 A1    Feb. 15, 2018

(30) Foreign Application Priority Data

Mar. 17, 2015  (JP) .................................. 2015-053539

(51) Int. Cl.
*G01B 11/06*    (2006.01)
(52) U.S. Cl.
CPC .......... *G01B 11/06* (2013.01); *G01B 11/0625* (2013.01)

(58) Field of Classification Search
CPC ................ G01B 11/06; G01B 11/0675; G01B 9/02021; G01B 9/02087
See application file for complete search history.

(56) References Cited

U.S. PATENT DOCUMENTS 4,785,336 A * 11/1988 McComb ........... G01B 11/0625
356/236
6,392,756 B1   5/2002 Li et al.

FOREIGN PATENT DOCUMENTS

| JP | 07-063524 A | 3/1995 |
| JP | 07-071924 A | 3/1995 |
| JP | 2013-145229 A | 7/2013 |

OTHER PUBLICATIONS

Katsuichi Kitagawa, Masafumi Otsuki, "Wide-view Transparent Film Thickness Measurement System by Interference Color Analysis," Journal of the Japan Society of Precision Engineering, Jan. 5, 2014, vol. 79 (2013, No. 11, pp. 1078-1082, Japan.
(Continued)

*Primary Examiner* — Hwa Andrew Lee
(74) *Attorney, Agent, or Firm* — Global IP Counselors, LLP

(57) ABSTRACT

A film thickness measurement device includes a light source, an imaging component, and a controller. The controller estimates unknown variables $I_1(j)$, $I_{20}(j)$, $k(j)$, and $t(i)$ based on the Formula (1), where i represents an observation point number of an interference image captured by the imaging component, j represents a number for a type of wavelength of monochromatic light, $\lambda(j)$ represents wavelength of the monochromatic light, n represents a refractive index of a semi-transparent film, $g(i,j)$ represents a brightness value observed at an observation point, $I_1(j)$ represents an intensity of reflected light from a front face of the semi-transparent film, $I_{20}(j)$ represents an intensity of reflected light from a rear face of the semi-transparent film
(Continued)

when there is no absorption of light in the semi-transparent film, k(j) represents an absorption coefficient of the semi-transparent film, and t(i) represents a film thickness of the semi-transparent film.

16 Claims, 4 Drawing Sheets

(56) References Cited

OTHER PUBLICATIONS

International Search Report of the corresponding International Application No. PCT/JP2016/054509, dated May 15, 2016.

* cited by examiner

| POINT NUMBER | COOR-DINATE | OBSERVED BRIGHTNESS ||| ESTIMATED BRIGHTNESS |||
|---|---|---|---|---|---|---|---|
| | | B | G | R | B | G | R |
| 1 | 21 | 47 | 26 | 30 | 47 | 26 | 30 |
| 2 | 41 | 97 | 163 | 186 | 97 | 163 | 186 |
| 3 | 61 | 130 | 22 | 29 | 130 | 22 | 29 |
| 4 | 81 | 13 | 133 | 175 | 13 | 133 | 175 |
| 5 | 101 | 119 | 23 | 31 | 119 | 23 | 31 |
| 6 | 121 | 57 | 105 | 163 | 57 | 105 | 163 |

FIG. 5

| VARIABLE | | TRUE VALUE | INITIAL VALUE | ESTIMATED VALUE | ERROR (%) |
|---|---|---|---|---|---|
| t | t(1) | 100.0 | 90.0 | 100.0 | 0.00 |
| | t(2) | 200.0 | 180.0 | 200.0 | 0.00 |
| | t(3) | 300.0 | 270.0 | 300.0 | 0.00 |
| | t(4) | 400.0 | 360.0 | 400.0 | 0.00 |
| | t(5) | 500.0 | 450.0 | 500.0 | 0.00 |
| | t(6) | 600.0 | 540.0 | 600.0 | 0.00 |
| $I_1$ | B | 20.0 | 18.0 | 20.0 | 0.00 |
| | G | 20.0 | 18.0 | 20.0 | 0.00 |
| | R | 20.0 | 18.0 | 20.0 | 0.00 |
| $I_{20}$ | B | 80.0 | 72.0 | 80.0 | 0.00 |
| | G | 80.0 | 72.0 | 80.0 | 0.00 |
| | R | 80.0 | 72.0 | 80.0 | 0.00 |
| k | B | 0.00040 | 0.00036 | 0.00040 | 0.00 |
| | G | 0.00030 | 0.00027 | 0.00030 | 0.00 |
| | R | 0.00020 | 0.00018 | 0.00020 | 0.00 |

FIG. 6

FILM THICKNESS MEASUREMENT DEVICE USING INTERFERENCE OF LIGHT AND FILM THICKNESS MEASUREMENT METHOD USING INTERFERENCE OF LIGHT

This application is a U.S. National stage of International Application No. PCT/JP2016/054509 filed on Feb. 17, 2016. This application claims priority to Japanese Patent Application No. 2015-053539 filed with Japan Patent Office on Mar. 17, 2015. The entire disclosure of Japanese Patent Application No. 2015-053539 is hereby incorporated herein by reference.

BACKGROUND

Field of the Invention

The present invention relates to a film thickness measurement device and a film thickness measurement method.

Background Information

A film thickness measurement device and a film thickness measurement method have been known in the past (see Japanese Patent Application Publication No. 2013-145229 (Patent Literature 1), for example).

Patent Literature 1 discloses a film thickness measurement device and a film thickness measurement method for collectively estimating the film thickness at a plurality of points by using information about reflected light at a plurality of points on a transparent film. With this film thickness measurement device and film thickness measurement method, light that includes monochromatic light of a plurality of wavelengths irradiates a transparent film, as a measurement object. A plurality of observation points are then selected from the interference image generated by the reflected light from the front face and the reflected light from the rear face of the transparent film, and the film thicknesses at a plurality of points are collectively estimated based on the brightness signal of the interference image at the selected observation points and a predetermined interference fringe model (interference fringe model for the transparent film).

SUMMARY

However, with the film thickness measurement device and film thickness measurement method described in Patent Literature 1, the configuration is such that the film thicknesses at a plurality of points of the transparent film are collectively estimated, but there is a need to collectively estimate the film thickness at a plurality of points for a semi-transparent film with a relatively high light absorption coefficient.

This invention was conceived in an effort to solve the above problem, and it is an object of this invention to provide a film thickness measurement device and a film thickness measurement method with which the film thicknesses can be collectively estimated at a plurality of points of a semi-transparent film.

To achieve the stated object, the film thickness measurement device pertaining to a first aspect of this invention comprises a light source that irradiates a semitransparent film, as a measurement object, with light that includes monochromatic light of a plurality of wavelengths; an imaging component that captures an interference image generated by reflected light from the front face and reflected light from the rear face of the semi-transparent film, the light being emitted from the light source; and a controller that estimates the unknown variables $I_1(j)$, $I_{20}(j)$, $k(j)$, and $t(i)$ based on the following Formula (1), when we let i be the observation point number of the interference image captured by the imaging component, j be the number for the type of wavelength of the monochromatic light, $\lambda(j)$ be the wavelength of the monochromatic light, n be the refractive index of the semi-transparent film, $g(i,j)$ be the brightness value observed at the observation point, $I_1(j)$ be the intensity of reflected light from the front face of the semi-transparent film, $I_{20}(j)$ be the intensity of reflected light from the rear face when there is no absorption of light in the semi-transparent film, $k(j)$ be the absorption coefficient of the semi-transparent film, and $t(i)$ be the thickness of the semi-transparent film. The "semi-transparent film" in the present invention means a film that is capable of transmitting light, but with which the intensity of light transmitted through the film decreases (some of the light is absorbed). This film is a colored transparent film that absorbs a specific wavelength, or a film that contains granules or the like that produce turbidity (haze).

$$g(i,j)=I_1(j)+I_{20}(j)e^{-2k(j)t(i)}\pm 2\sqrt{I_1(j)I_{20}(j)}e^{-k(j)t(i)}\cos\{4\pi nt(i)/\lambda(j)\} \quad (1)$$

With the film thickness measurement device in the first aspect, because there is provided a controller that estimates the unknown variables $I_1(j)$, $I_{20}(j)$, $k(j)$, and $t(i)$ based on Formula (1) above, $I_1(j)$, $I_{20}(j)$, $k(j)$, and $t(i)$ are collectively estimated for a plurality of observation points (i). Specifically, unlike with a transparent film, the use of the above Formula (1) that takes into account the absorption of light by a semitransparent film ($e^{-2k(j)t(i)}$, $e^{-k(j)t(i)}$) makes it possible to collectively estimate the thickness $t(i)$ at a plurality of points of the semi-transparent film. As a result, the thickness $t(i)$ at a plurality of points of the semi-transparent film can be estimated faster than when the film thickness is estimated one point at a time.

In the film thickness measurement device according to the first aspect, it is preferable if the controller is configured to estimate, as an unknown variable, the film thickness t at an observation point other than the observation points of the interference image used in finding $I_1(j)$, $I_{20}(j)$, and $k(j)$, based on the following Formula (2) and the $I_1(j)$, $I_{20}(j)$, and $k(j)$ found based on the above Formula (1).

[Mathematical Formula (2)]

$$g(j)=I_1(j)+I_{20}(j)e^{-2k(j)t}\pm 2\sqrt{I_1(j)I_{20}(j)}e^{-k(j)t}\cos\{4\pi nt/\lambda(j)\} \quad (2)$$

With this configuration, in the above Formula (2), since the number of unknown variables is just one, namely, the film thickness t, the thickness t can be estimated faster than when using the above Formula (1) (in which the number of unknown variables is four, namely, $I_1(j)$, $I_{20}(j)$, $k(j)$, and $t(i)$).

In the film thickness measurement device according to the first aspect, it is preferable if the controller is configured to set initial values for the unknown variables, and to estimate the unknown variables by nonlinear programming that minimizes the objective function, based on values calculated from a function including the unknown variables. With this configuration, unknown variables can be estimated even when the function including the unknown variables cannot be solved analytically (in the case of a nonlinear function).

In the film thickness measurement device according to the first aspect, it is preferable if the device is configured so as to set the number N of observation points of the interference image for finding the unknown variables $I_1(j)$, $I_{20}(j)$, $k(j)$, and $t(i)$ based on the following Formula (3), when we let m be the number of the plurality of monochromatic light wavelengths, and N be the number of observation points of the interference image.

[Mathematical Formula (3)]

$$N \geq 3m/(m-1) \tag{3}$$

With this configuration, the minimum number of observation points in an interference image required with respect to unknown variables can be easily found based on the above Formula (3).

In the film thickness measurement device according to the first aspect, it is preferable if the plurality of types of monochromatic light include monochromatic light of the three colors of blue, green, and red. With this configuration, since the wavelengths of the three colors of monochromatic light are different from each other, the interference color generated by interference of the three colors of monochromatic light varies with the film thickness. Consequently, the film thickness can be estimated based on the brightness value $g(i,j)$ (or the brightness value $g(j)$) observed at the observation point.

The film thickness measurement method according to a second aspect of this invention comprises the steps of irradiating a semi-transparent film, as a measurement object, with light that includes monochromatic light of a plurality of wavelengths; capturing an interference image generated by reflected light from the front face and reflected light from the rear face of the semi-transparent film; and estimating the unknown variables $I_1(j)$, $I_{20}(j)$, $k(j)$, and $t(i)$ based on the following Formula (4), when we let i be the observation point number of the captured interference image, j be the number for the type of wavelength of the monochromatic light, $\lambda(j)$ be the wavelength of the monochromatic light, n be the refractive index of the semi-transparent film, $g(i,j)$ be the brightness value observed at the observation point, $I_1(j)$ be the intensity of reflected light from the front face of the semi-transparent film, $I_{20}(j)$ be the intensity of reflected light from the rear face when there is no absorption of light in the semi-transparent film, $k(j)$ be the absorption coefficient of the semi-transparent film, and $t(i)$ be the thickness of the semi-transparent film.

[Mathematical Formula (4)]

$$g(i,j) = I_1(j) + I_{20}(j)e^{-2k(j)t(i)} \pm 2\sqrt{I_1(j)I_{20}(j)}e^{-k(j)t(i)} \cos\{4\pi nt(i)/\lambda(j)\} \tag{4}$$

With the film thickness measurement method according to the second aspect, as discussed above, there is provided a step of estimating the unknown variables $I_1(j)$, $I_{20}(j)$, $k(j)$, and $t(i)$ based on the above Formula (4), so that $I_1(j)$, $I_{20}(j)$, $k(j)$, and $t(i)$ are collectively estimated for a plurality of observation points (i). That is, unlike with a transparent film, the use of the above Formula (4) that takes into account the absorption of light by a semitransparent film ($e^{-2k(j)t(i)}$, $e^{-k(j)t(i)}$) makes it possible to collectively estimate the thickness $t(i)$ at a plurality of points of the semi-transparent film. As a result, the thickness $t(i)$ at a plurality of points of the semi-transparent film can be estimated faster than when the film thickness is estimated one point at a time.

As described above, the present invention allows the film thicknesses at a plurality of points of a semi-transparent film to be collectively estimated.

BRIEF DESCRIPTION OF THE DRAWINGS

FIG. 5 is a diagram (1) showing the results of an experiment for confirming the validity of the GMFT method pertaining to an embodiment of the present invention;

FIG. 6 is a diagram (2) showing the results of an experiment for confirming the validity of the GMFT method pertaining to an embodiment of the present invention;

DETAILED DESCRIPTION OF EMBODIMENTS

Embodiments of the present invention will now be described through reference to the drawings.

[Embodiment]
(Configuration of Film Thickness Measurement Device)

The configuration of a film thickness measurement device 100 pertaining to this embodiment will be described through reference to FIG. 1.

Figure 1:
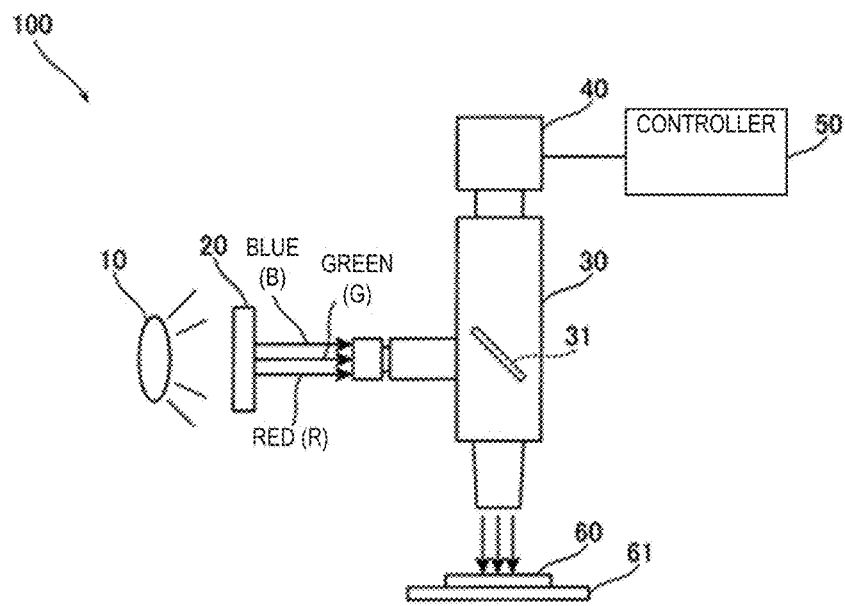
FIG. 1 is a block diagram of a film thickness measurement device pertaining to an embodiment of the present invention.

As shown in FIG. 1, the film thickness measurement device 100 comprises a white light source 10, a three-wavelength band filter 20, a microscope 30, a color camera 40, and a controller 50. The white light source 10 and the color camera 40 are examples of the "light source" and the "imaging component" of the present invention, respectively.

The white light source 10 is configured to irradiate a semi-transparent film 60 (the measurement object) with light that includes monochromatic light of a plurality of wavelengths. In this embodiment, the plurality of types of monochromatic light include monochromatic light of the three colors of blue (B), green (G), and red (R). The "semi-transparent film" in this embodiment means a film that is capable of transmitting light, but with which the intensity of light transmitted through the film decreases (some of the light is absorbed). This film is a colored transparent film that absorbs a specific wavelength, or a film that contains granules or the like that produce turbidity (haze).

The three-wavelength band filter 20 is configured to transmit monochromatic light of three colors, namely, blue (B), green (G), and red (R), out of the white light emitted from the white light source 10.

A half mirror 31 is provided inside the microscope 30. The half mirror 31 is configured so as to irradiate the semitransparent film 60 (the measurement object) with monochromatic light of three colors, namely, blue (B), green (G), and red (R), that has passed through the three-wavelength band filter 20.

The color camera 40 is configured to capture an interference image that is generated by reflected light from the front face and reflected light from the rear face of the semi-transparent film 60, with this light having been emitted from the white light source 10. Also, the color camera 40 is constituted, for example, by a CCD (charge coupled device) image sensor, a CMOS (complementary metal oxide semiconductor) image sensor, or the like.

In this embodiment, the controller 50 is configured to estimate $I_1(j)$, $I_{20}(j)$, $k(j)$, and $t(i)$ based on the following Formula (9), when we let i be the observation point number of the interference image, j be the number for the type of wavelength of the monochromatic light, $\lambda(j)$ be the wavelength of the monochromatic light, n be the refractive index of the semi-transparent film 60, g(i,j) be the brightness value observed at the observation point, $I_1(j)$ be the intensity of reflected light from the front face of the semi-transparent film 30, $I_{20}(j)$ be the intensity of reflected light from the rear face when there is no absorption of light in the semi-transparent film 60, k(j) be the absorption coefficient of the semi-transparent film 30, and t(i) be the thickness of the semi-transparent film 30. Furthermore, the controller 50 is configured to estimate, as an unknown variable, the film thickness t at an observation point other than the observation points of the interference image used in finding $I_1(j)$, $I_{20}(j)$, and k(j), based on the following Formula (19) and the $I_1(j)$, $I_{20}(j)$, and k(j) found based on the following Formula (9). More specifically, the controller 50 sets the initial values for unknown variables and estimates unknown variables by nonlinear programming that minimizes an objective function, based on values calculated from a function including the unknown variables. This will be described in detail below.

(Estimation Principle)

<Relation Between Interference Color and Film Thickness in Semi-Transparent Film>

The relation between the interference color and the film thickness in the semi-transparent film 60 will first be described.

As to the interference produced by reflected light from the front face and reflected light from the rear face of the semitransparent film 60, if multiple reflection is ignored, the sum of reflected light is expressed by the following Formula (5).

[Mathematical Formula (5)]

$$I(\lambda) = I_1(\lambda) + I_2(\lambda) + 2\sqrt{I_1(\lambda)I_2(\lambda)}\cos\{4\pi\delta(\lambda)\} \quad (5)$$

Here, $I_1$ and $I_2$ represent the intensity of the reflected light from the front face (amount of light) and the intensity of reflected light from the rear front face (amount of light), respectively. $\lambda$ represents the wavelength of the light that irradiates the semi-transparent film 60, and $\delta$ represents the phase difference between the reflected light from the front face and the reflected light from the rear face.

If we let t be the physical film thickness of the semi-transparent film 60 and $n(\lambda)$ be film refractive index, and if we assume that light is incident on the semi-transparent film 60 perpendicularly, the optical path difference (OPD) between the reflected light from the front face and reflected light from the rear face is OPD=$2n(\lambda)\times t$. Thus, the phase difference $\delta(\lambda)$ is $\delta(\lambda)=2\pi\times OPD/\lambda=4\pi n(\lambda)t/\lambda$. The following Formula (6) is obtained by plugging this formula into the above Formula (5), and assuming that there is no wavelength dependency of the refractive index (that is, $n(\lambda)=n$).

[Mathematical Formula (6)]

$$I(\lambda) = I_1(\lambda) + I_2(\lambda) \pm 2\sqrt{I_1(\lambda)I_2(\lambda)}\cos\{(4\pi nt/\lambda)\} \quad (6)$$

Here, when the refractive index of the semi-transparent film 60 is lower than the refractive index of a substrate 61 (see FIG. 1) on which the semi-transparent film 60 is placed (film refractive index<substrate refractive index), the sign of the third term on the right side in the above Formula (6) becomes positive (+). On the other hand, if film refractive index>substrate refractive index, then the phase difference 0.5 will be such that $\delta(\lambda)=4\pi n(\lambda)t/\lambda+\pi$, so the sign of the third term on the right side in the above Formula (6) becomes negative (−).

The intensity $I_2$ of reflected light from the rear face of the semi-transparent film 60 is expressed by the following Formula (7), by the Lambert-Beer law, in which k is the absorption coefficient of the semi-transparent film 60.

[Mathematical Formula (7)]

$$I_2(\lambda) = I_{20}(\lambda)e^{-2k(\lambda)t} \quad (7)$$

The following Formula (8) is obtained from the above Formulas (6) and (7).

[Mathematical Formula (8)]

$$I(\lambda) = I_1(\lambda) + I_{20}(\lambda)e^{-2k(\lambda)t} \pm 2\sqrt{I_1(\lambda)I_{20}(\lambda)}e^{-k(\lambda)t}\cos\{4\pi nt/\lambda\} \quad (8)$$

Here, let us assume that the wavelengths of the blue (B), green (G), and red (R) light emitted from the white light source 10, each of which is monochromatic light that passes through the three-wavelength band filter 20, are $\lambda_B=470$ nm, $\lambda_G=560$ nm, and $\lambda_R=600$ nm, respectively. Let us also assume that $I_1=20$, $I_{20}=80$, and the film refractive index n=1.4. Let us also assume that the absorption coefficients for blue (B), green (G), and red (R) are k(B)=0.0004 (1/nm), k(G)=0.0003 (1/nm), and k(R)=0.0002 (1/nm). The relation between the amount of reflected light and the film thickness is then calculated from the above Formula (8) to obtain the relation between film thickness and brightness value (amount of light) (see the lower part of FIG. 2) and the relation between film thickness and interference color (see the upper part of FIG. 2).

Figure 2:
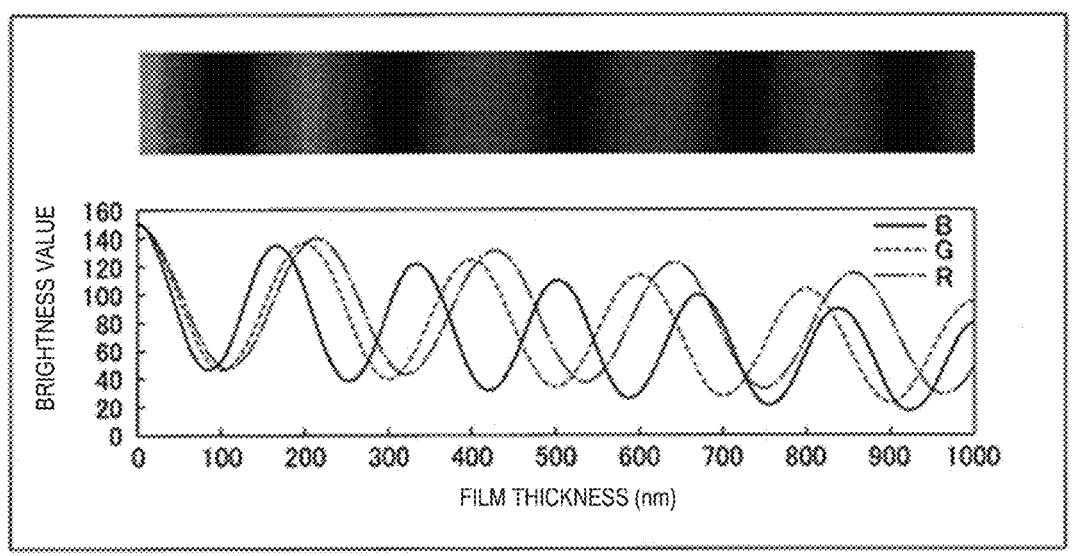
FIG. 2 is a graph of the relation between film thickness and brightness value (amount of light)

In the lower part of FIG. 2, the horizontal axis represents film thickness (nm) and the vertical axis represents brightness value. As shown in the lower part of FIG. 2, the wavelength (cycle) becomes longer in the order of blue (B), green (G), and red (R). Also, the brightness value decreases as the film thickness increases.

The upper part of FIG. 2 shows a color chart of interference color with respect to various film thicknesses (nm). That is, in the upper part of FIG. 2, the color obtained by adding blue (B), green (G), and red (R) in the lower part of FIG. 2 is shown for each film thickness. The upper part of FIG. 2 is depicted by gray shading, but in reality it is interference color with shading in color. Thus, different interference colors are obtained for each film thickness.

<GMFT Method>

An algorithm for estimating the unknown variables $I_1$, $I_{20}$, k, and t will now be described. This algorithm is called the GMFT (global model fitting for thickness) method.

The model brightness value g(i,j) of the interference fringe for the number j (j=1, 2, ..., m) for the type of wavelength of monochromatic light at an observation point i (i=1, 2, ..., N) within an image (interference color image) of the semitransparent film 60 captured by the color camera 40 is expressed by the following Formula (9) by modifying the above Formula (8).

[Mathematical Formula (9)]

$$g(i,j) = I_1(j) + I_{20}(j)e^{-2k(j)t(i)} \pm 2\sqrt{I_1(j)I_{20}(j)}e^{-k(j)t(i)}\cos\{4\pi nt(i)/\lambda(j)\} \quad (9)$$

Here, the intensity $I_1(j)$ of the reflected light from the front face of the semi-transparent film 60, the intensity $I_{20}(j)$ of the reflected light from the rear face of the semi-transparent film 60 when there is no absorption, and the absorption coefficient k(j) of the semi-transparent film 60 are assumed to be constants, independent of the observation point. This assumption generally holds if the semitransparent film 60 whose thickness is to be estimated has the same (uniform) configuration and if the light emitted from the white light source 10 is uniform.

In this embodiment, the configuration is such that the unknown variables $I_1(j)$, $I_{20}(j)$, $k(j)$, and $t(i)$ are estimated based on the model brightness value $g(i,j)$ of the interference fringe and brightness values observed at a plurality of points. More specifically, the unknown variables (parameters) $I_1(j)$, $I_{20}(j)$, $k(j)$, and $t(i)$ are estimated by nonlinear programming that minimizes the error sum of squares in the following Formula (10) (least squares method).

[Mathematical Formula (10)]

$$J = \sum_{i=1}^{N} \sum_{j=1}^{m} [g(i,j) - g_{ij}]^2 \tag{10}$$

Here, $g(i,j)$ represents the model brightness value of the above Formula (9), and $g_{ij}$ represents the observed brightness value.

Next, the conditions for finding the unknown variables $I_1(j)$, $I_{20}(j)$, $k(j)$, and $t(i)$ will be described. Assuming that there are m number of wavelengths of monochromatic light and there are N number of observation points, the number of unknown variables is 3m+N. mN number of brightness signals are obtained from the count of the N number of observation points. In this embodiment, the configuration is such that the observation points in the interference image for finding the unknown variables $I_1(j)$, $I_{20}(j)$, $k(j)$, and $t(i)$ is set to the number N based on the following Formula (11).

[Mathematical Formula (11)]

$$N \geq 0.3m/(m-1) \tag{11}$$

For example, in this embodiment, since the number of wavelengths of monochromatic light (blue, green, and red) is 3 (m=3), N is at least 5. That is, if there are data for at least five observation points, it is possible to estimate the unknown variables.

Figure 3:
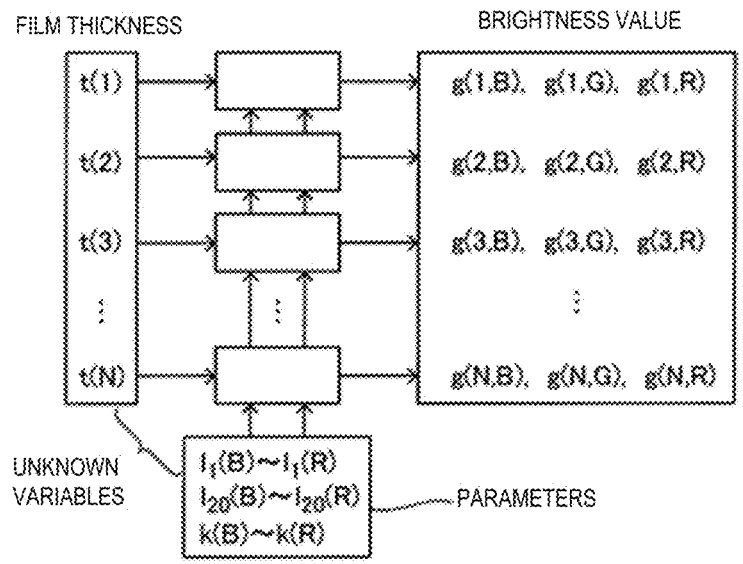
FIG. 3 is a diagram illustrating a GMFT method pertaining to an embodiment of the present invention.

When the number of wavelengths of monochromatic light is 3 (m=3) and the number of observation points is N, the estimation (measurement) algorithm is schematically represented as shown in FIG. 3. That is, N number of thicknesses (t(1), . . . , t(N)) and nine parameters ($I_1(B)$, $I_1(G)$, $I_1(R)$, $I_{20}(B)$, $I_{20}(G)$, $I_{20}(R)$, $k(B)$, $k(G)$, and $k(R)$) are estimated from 3N observed brightness values ($g(1,B)$, $g(1,G)$, $g(1,R)$, . . . , $g(N,B)$, $g(N,G)$, $g(N,R)$).

Since the model brightness value of the above Formula (9) includes a cosine function (cos function), which is a periodic function, when the least squares method is used in the estimation algorithm of this embodiment, there are numerous local minimums. Therefore, it is necessary to set an appropriate initial value.

Next, the method for estimating the approximate values of $I_1$ and $I_{20}$ from the observed brightness value will be described.

The median value a and the amplitude b of the brightness values are found with the following Formulas (12) and (13), respectively, from the observed brightness values (the brightness values at the observation points).

[Mathematical Formulas (12) and (13)]

$$a = (\text{max} + \text{min})/2 \tag{12}$$

$$b = (\text{max} - \text{min})/2 \tag{13}$$

Here, max represents the maximum value of the brightness value, and min represents the minimum value.

Next, if we assume that there is little absorption of light by the semi-transparent film 60 (that is, that $e^{-2k(j)t(i)}=1$ and $e^{-k(j)t(i)}=1$) in the above Formula (9), we obtain the following Formulas (14) and (15).

[Mathematical Formulas (14) and (15)]

$$a = I_1 + I_{20} \tag{14}$$

$$b = 2\sqrt{I_1 I_{20}} \tag{15}$$

The following Formulas (16) and (17) are obtained from the above Formulas (14) and (15).

[Mathematical Formulas (16) and (17)]

$$I_1 = (a \pm \sqrt{a^2 - b^2})/2 \tag{16}$$

$$I_{20} = (a \mp \sqrt{a^2 - b^2})/2 \tag{17}$$

Here, the ± sign is dependent on the magnitude relation between $I_1$ and $I_{20}$. This magnitude relation can be found with the following Formula (18) derived from Fresnel's equation.

[Mathematical Formula (18)]

$$I_1/I_{20} = (n-1)^2(n+1)^2(n+n_B)^2/16n^2(n-n_B)^2 \tag{18}$$

Here, n represents the refractive index of the semi-transparent film 60, and $n_B$ represents the refractive index of the substrate 61 on which the semi-transparent film 60 is placed. If the above Formula (18) is at least 1, the ± sign of Formula (16) becomes positive (+), and if it is less than 1 it becomes negative (−). Similarly, if the above Formula (18) is at least 1, the ± sign of the Formula (17) becomes negative (−), and if it is less than 1, it becomes positive (+). Thus, the approximate values of $I_1(j)$ and $I_{20}(j)$ can be estimated from the observed brightness values.

Of the other unknown variables $k(j)$ and $t(i)$, since $k(j)$ has no periodicity, there is no problem if its initial value is "0." On the other hand, since $t(i)$ is in a cos function, it has periodicity. In view of this, the initial value of $t(i)$ is set accurately from empirical information.

<Brightness Matching Method>

Next, the algorithm for estimating the unknown variable t will be described. This algorithm is called a brightness matching method. With this brightness matching method, the three unknown variables $I_1$, $I_{20}$, and k estimated by GMFT method are used to estimate the remaining unknown variable t.

By modifying the above Formula (9), the relation between brightness value and film thickness for each wavelength (j) of monochromatic light is expressed by the following Formula (19).

[Mathematical Formula (19)]

$$g(j) = I_1(j) + I_{20}(j)e^{-2k(j)t} \pm 2\sqrt{I_1(j)I_{20}(j)}e^{-k(j)t} \cos\{4\pi nt/\lambda(j)\} \tag{19}$$

Here, the only unknown number is t.

That is, in this embodiment, the configuration is such that the thickness t at an observation point other than the observation points used in finding the $I_1(j)$, the $I_{20}(j)$, and $k(j)$ is estimated as an unknown variable based on the above Formula (19) and the $I_1(j)$, the $I_{20}(j)$, and $k(j)$ found based on the GMFT method (the above Formula (9)). More specifically, the configuration is such that the unknown variable t is estimated based on the observed brightness value and the model brightness value g(j) of the interference fringe. That is, the unknown variable t(i) is estimated by nonlinear programming that minimizes the error sum of squares of the following Formula (20).

[Mathematical Formula (20)]

$$J = \sum_{j=1}^{m} [g(j) - g_j]^2 \quad (20)$$

Here, g(j) represents the model brightness value of the above Formula (19), and $g_j$ represents the observed brightness value.

Since the model brightness value g (j) of the above Formula (19) includes a periodic function, when nonlinear programming is used, there are numerous local minimums. Therefore, with typical nonlinear programming the solution ends up converging on a local solution in the vicinity of the initial value, and the correct solution may not be obtained. In view of this, a multi-start method is used in this embodiment. That is, a plurality of solutions are found by using nonlinear programming and starting from a plurality of initial values having preset increment intervals within the range of expected film thicknesses. Then, from the plurality of solutions thus obtained, the one in which the error sum of squares is at the minimum is adopted as a global solution.

Since the film thickness t(i) of the semi-transparent film 60 is thus estimated using the above Formula (9) or (19), there is no need to use a relatively complicated optical system such as a spectroscope or a polarizing optical system, and this allows the configuration of the film thickness measurement device 100 to be that much simpler. Also, it is possible to estimate the film thickness t(i) without using a conversion table (calibration data) or the like to obtain film thickness from a captured image (interference color). Also, since the film thickness t(i) can be estimated for each observation point (that is, for each pixel of the interference image), the film thickness measurement device 100 can be configured to have a relatively high horizontal resolution.

(Film Thickness Measurement Method)

The film thickness measurement method pertaining to this embodiment will now be described through reference to FIG. 4.

Figure 4:
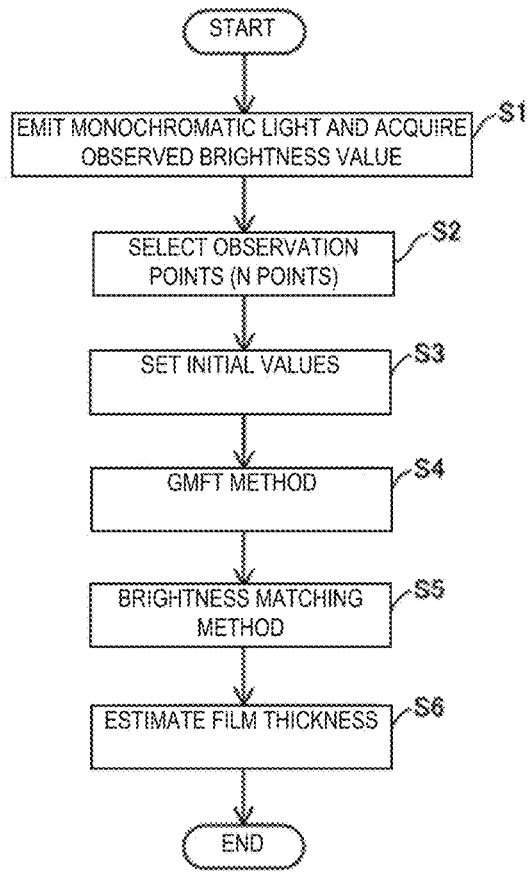
FIG. 4 is a flowchart of a film thickness measurement method pertaining to an embodiment of the present invention.

As shown in FIG. 4, in step S1, the semitransparent film 60 (the measurement object) is irradiated with light that includes monochromatic light with a plurality of wavelengths (blue, green, and red) from the white light source 10, via the three-wavelength band filter 20 and the half mirror 31. An interference image generated by the reflected light from the front face and the reflected light from the rear face of the semi-transparent film 60 is captured by the color camera 40 to acquire the observed brightness value.

Next, in step S2, observation points are selected in the number determined based on the above Formula (11).

Next, in step S3, initial values are set for the unknown variables $I_1(j)$, $I_{20}(j)$, k(j), and t(i).

Next, in step S4, the unknown variables $I_1(j)$, $I_{20}(j)$, k(j), and t(i) are estimated based on the GMFT method (the above Formula (9)). Consequently, $I_1(j)$, $I_{20}(j)$, k(j), and t(i) are collectively estimated for a plurality of observation points (i). That is, the film thicknesses t(i) at a plurality of points of the semi-transparent film 60 are collectively estimated.

Next, in step S5, the $I_1(j)$, $I_{20}(j)$, and k(j) estimated by GMFT method are used to estimate the unknown variable t at the desired observation point (an observation point other than the observation points used in the GMFT method) based on the brightness matching method (the above Formula (19)). Multiple solutions are found by using the multi-start method (starting from multiple initial values).

Finally, in step S6, of the plurality of solutions found, the one with which the error sum of squares is at the minimum (that is, a global solution) is employed (estimated) as the film thickness.

(Experiment)

An experiment for confirming the validity of the GMFT method and the brightness matching method will now be described through reference to FIGS. 5 to 8.

In this experiment, the color chart shown in the upper part of FIG. 2 served as the image that was the object of the experiment. That is, the wavelengths of blue (B), green (G), and red (R) were λB=470 nm, λG=560 nm, and λR=600 nm, respectively. Also, $I_1$ was set to 20, $I_{20}$ to 80, and the film refractive index n to 1.4. The absorption coefficients k for blue (B), green (G), and red (R) were set to k(B)=0.0004 (1/nm), k(G)=0.0003 (1/nm), and k(R)=0.0002 (1/nm). The color chart in the upper part of FIG. 2 has 200 pixels in the horizontal direction. Also, Solver (registered trademark) function of Excel (registered trademark) made by Microsoft was used as the nonlinear programming method (specifically, the least squares method).

In experimentation into the GMFT method, six points that were equidistantly spaced apart in the color chart were used as observation points. The brightness values at the six observation points were then used to estimate the unknown variables $I_1(j)$, $I_{20}(j)$, k(j), and t(i) based on the GMFT method (the above Formula (9)).

In experimentation into the brightness matching method, the thickness t at 200 observation points in the horizontal direction of the color chart was estimated based on the brightness matching method (the above Formula (19)) using the unknown variables $I_1(j)$, $I_{20}(j)$, k(j), and t(i) estimated by the GMFT method. With the brightness matching method, a multi-start method was employed in which the range of thickness t of the semi-transparent film 60 was 1000 nm and the increment interval was 100 nm.

<Results of Experimentation into GMFT Method>

As shown in FIG. 5, at all six observation points (point numbers 1 to 6), the observed brightness values perfectly matched the brightness values estimated from the above Formula (9) for all the monochromatic light (blue (B), green (G), and red (R)).

Figure 7:
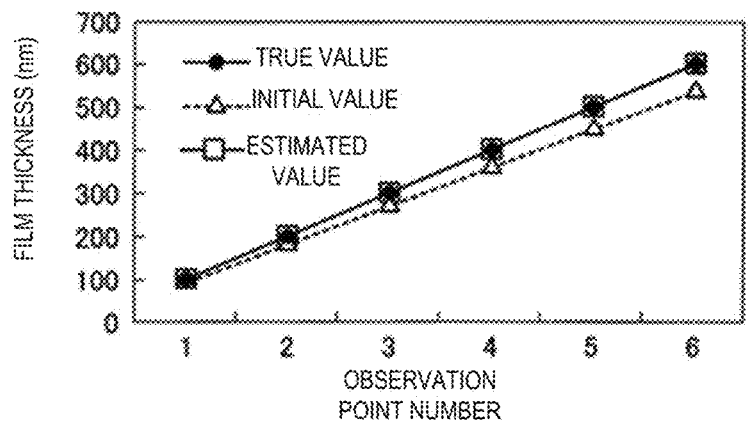
FIG. 7 is a graph (3) of the results of an experiment for confirming the validity of the GMFT method pertaining to an embodiment of the present invention.

As shown in FIG. 6, in this experiment, the GMFT method was applied, setting the initial values of the unknown variables $I_1(j)$, $I_{20}(j)$, k(j), and t(i) to 90% of the respective true values. As a result, there was a match with the true values for all of the unknown variables $I_1$(B,G,R), $I_{20}$(B,G,R) and k(B,G,R). Also, as shown in FIGS. 6 and 7, there was a match with the true values for all of the thicknesses t (1 to 6). That is, the error was 0%. This confirmed that the GMFT method is effective at estimating the unknown variables $I_1(j)$, $I_{20}(j)$, k(j), and t(i).

<Experimental Results for Brightness Matching Method>

Figure 8:
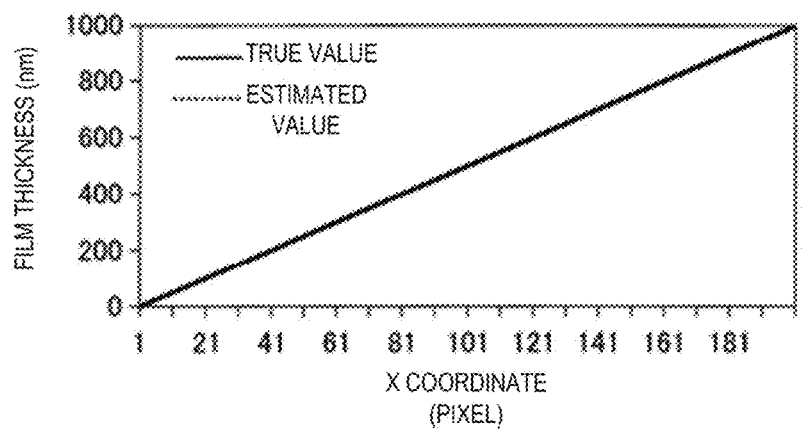
FIG. 8 is a graph of the results of an experiment for confirming validity of a brightness matching method pertaining to an embodiment of the present invention.

As shown in FIG. 8, there was a perfect match between the estimated thickness and the true value at all of the 200 observation points in the horizontal direction (x coordinates 1 to 200). This confirmed that the brightness matching method is effective at estimating the unknown variable t(i). Since the estimated film thickness and the true value matches perfectly, in FIG. 8, the curve of estimated film thickness and the curve of the true value are displayed overlapping.

(Effect of this Embodiment)

The effect of this embodiment will now be described.

In this embodiment, as discussed above, the controller 50 is provided for estimating the unknown variables $I_1(j)$, $I_{20}(j)$, $k(j)$, and $t(i)$ based on the above Formula (9). Consequently, $I_1(j)$, $I_{20}(j)$, $k(j)$, and $t(i)$ are collectively estimated at a plurality of observation points (i). That is, unlike with a transparent film, the use of the above Formula (9) that takes into account the absorption of light by a semitransparent film 60 ($e^{-2k(j)t(i)}$, $e^{-k(j)t(i)}$) makes it possible to collectively estimate the thickness $t(i)$ at a plurality of points of the semi-transparent film 60. As a result, the thickness $t(i)$ at a plurality of points of the semi-transparent film 60 can be estimated faster than when the film thickness is estimated one point at a time.

Also, with this embodiment, as discussed above, the controller 50 is configured to estimate, as an unknown variable, the film thickness t at an observation point other than the observation points of the interference image used in finding $h(j)$, $I_{20}(j)$, and $k(j)$, based on the above Formula (19) and the $I_1(j)$, $I_{20}(j)$, and $k(j)$ found based on the above Formula (9). Consequently, since the number of unknown variables is just one, namely, the film thickness t in the above Formula (19), the thickness t can be estimated faster than when using the above Formula (9) (in which the number of unknown variables is 3m+N, namely, $I_1(j)$, $I_{20}(j)$, $k(j)$, and $t(i)$).

Also, in this embodiment, as discussed above, the controller 50 is configured to set initial values for the unknown variables, and to estimate the unknown variables by nonlinear programming that minimizes the objective function, based on values calculated from a function including the unknown variables. Consequently, unknown variables can be estimated even when the function including the unknown variables cannot be solved analytically (in the case of a nonlinear function).

Also, in this embodiment, as discussed above, the number N of observation points of the interference image for finding the unknown variables $I_1(j)$, $I_{20}(j)$, $k(j)$, and $t(i)$ is set based on the above Formula (11), when we let m be the number of the plurality of monochromatic light wavelengths, and N be the number of observation points of the interference image. With this configuration, the minimum number of observation points in an interference image required with respect to unknown variables can be easily found based on the above Formula (11).

Also, in this embodiment, as discussed above, the plurality of types of monochromatic light include monochromatic light of the three colors of blue, green, and red. Consequently, since the wavelengths of the three colors of monochromatic light are different from each other, the interference color generated by interference of the three colors of monochromatic light varies with the film thickness. As a result, the film thickness can be estimated based on the brightness value $g(i,j)$ (or the brightness value $g(j)$) observed at the observation point.

[Modification Examples]

The embodiments and examples disclosed herein are just examples in every respect, and should not be interpreted as being limiting in nature. The scope of the invention being indicated by the appended claims rather than by the above description of the embodiments, all modifications (modification examples) within the meaning and range of equivalency of the claims are included.

For instance, in the above embodiment, an example was given in which the semi-transparent film was irradiated with blue, green, and red monochromatic light through a three-wavelength band filter, but the present invention is not limited to or by this. For example, the semi-transparent film may be irradiated with light from a light source that emits blue, green, and red monochromatic light.

In the above embodiment, an example was given in which the semi-transparent film was irradiated with blue, green, and red monochromatic light (three kinds), but the present invention is not limited to or by this. For instance, the semi-transparent film may be irradiated with jus two kinds of monochromatic light.

Also, in the above embodiment (experiment), an example was given in which the brightness values at six observation points were used in the GMFT method (the above Formula (9)), but the present invention is not limited to or by this. In the present invention, as long as the above Formula (11) is satisfied, a number of brightness values other than six may be used.

Also, in the above embodiment (experiment), an example was given in which a multi-start method (starting from a plurality of initial values) was used to estimate the film thickness, but the present invention is not limited to or by this. If the approximate value of the thickness (an accurate initial value) is known, the film thickness may be estimated from just one initial value.

The invention claimed is:

1. A film thickness measurement device, comprising:
    a light source configured to irradiate a semi-transparent film, which is a measurement object, with light that includes a plurality of monochromatic lights having different wavelengths relative to each other;
    a camera configured to capture an interference image generated by reflected light of the light reflected from a front face of the semi-transparent film and reflected light of the light reflected from a rear face of the semi-transparent film; and
    an electric controller operatively coupled to the camera and configured to obtain a brightness value for each of observation points of the interference image based on the interference image, the electric controller being configured to calculate unknown variables $I_1(j)$, $I_{20}(j)$, $k(j)$, and $t(i)$ that minimize an error sum of squares between the brightness value obtained from the interference image and a brightness value $g(i,j)$ represented by the following Formula (1) for each of the observation points of the interference image and for each of the monochromatic lights:

$$g(i,j)=I_1(j)+I_{20}(j)e^{-2k(j)t(i)}\pm 2\sqrt{I_1(j)I_{20}(j)}e^{-k(j)t(i)}\cos\{4\pi n t(i)/\lambda(j)\} \quad (1),$$

where i indicates an observation point of the interference image captured by the camera, j indicates a monochromatic light, $\lambda(j)$ represents wavelength of the monochromatic light, n represents a refractive index of the semi-transparent film, $I_1(j)$ represents an intensity of the reflected light from the front face of the semi-transparent film, $I_{20}(j)$ represents an intensity of the reflected light from the rear face of the semi-transparent film when there is no absorption of light in the semi-transparent film, $k(j)$ represents an absorption coefficient of the semi-transparent film, and $t(i)$ represents a film thickness of the semi-transparent film.

2. The film thickness measurement device according to claim 1, wherein
    the electric controller is configured to calculate, as an unknown variable, a film thickness t at an observation point other than observation points of the interference image used in calculating $I_1(j)$, $I_{20}(j)$, and $k(j)$ using the Formula (1), the electric controller being configured to calculate the film thickness t at the observation point to minimize an error sum of squares between brightness value obtained from the interference image at the observation point and a brightness value g(j) represented by the following Formula (2) for each of the monochromatic lights:

$$g(j) = I_1(j) + I_{20}(j)e^{-2k(j)t} \pm 2\sqrt{I_1(j)I_{20}(j)}e^{-k(j)t}\cos\{4\pi nt/\lambda(j)\} \quad (2),$$

where the $I_1(j)$, $I_{20}(j)$, and $k(j)$ are calculated by using the Formula (1).

3. The film thickness measurement device according to claim 1, wherein
the electric controller is configured to set initial values for the unknown variables, and to calculate the unknown variables by nonlinear programming that minimizes an objective function, using values calculated from a function including the unknown variables.

4. The film thickness measurement device according to claim 1, wherein
the electric controller is configured to set a number N of observation points of the interference image for finding the unknown variables $I_1(j)$, $I_{20}(j)$, $k(j)$, and $t(i)$ to satisfy the following Formula (3):

$$N \geq 3m/(m-1) \quad (3),$$

where m represents a number of the wavelengths of the monochromatic lights, and N represents the number of the observation points of the interference image.

5. The film thickness measurement device according to claim 1, wherein
the monochromatic lights are blue, green, and red monochromatic lights.

6. A film thickness measurement method, comprising:
irradiating, by a light source, a semi-transparent film, which is a measurement object, with light that includes a plurality of monochromatic lights having different wavelengths relative to each other;
capturing, by a camera, an interference image generated by reflected light of the light reflected from a front face of the semi-transparent film and reflected light of the light reflected from a rear face of the semi-transparent film;
obtaining, by an electric controller that is operatively coupled to the camera, a brightness value for each of observation points of the interference image based on the interference image; and
calculating, by the electric controller, unknown variables $I_1(j)$, $I_{20}(j)$, $k(j)$, and $t(i)$ that minimize an error sum of squares between the brightness value obtained from the interference image and a brightness value g(i,j) represented by the following Formula (4) for each of the observation points of the interference image and for each of the monochromatic lights:

$$g(i,j) = I_1(j) + I_{20}(j)e^{-2k(j)t(i)} \pm 2\sqrt{I_1(j)I_{20}(j)}e^{-k(j)t(i)}\cos\{4\pi nt(i)/\lambda(j)\} \quad (4),$$

where i indicates an observation point of the interference image, j indicates a monochromatic light, $\lambda(j)$ represents wavelength of the monochromatic light, n represents a refractive index of the semi-transparent film, $I_1(j)$ represents an intensity of the reflected light from the front face of the semi-transparent film, $I_{20}(j)$ represents an intensity of the reflected light from the rear face of the semi-transparent film when there is no absorption of light in the semi-transparent film, $k(j)$ represents an absorption coefficient of the semi-transparent film, and $t(i)$ represents a film thickness of the semi-transparent film.

7. The film thickness measurement device according to claim 2, wherein
the electric controller is configured to set initial values for the unknown variables, and to calculate the unknown variables by nonlinear programming that minimizes an objective function, using values calculated from a function including the unknown variables.

8. The film thickness measurement device according to claim 3, wherein
the electric controller is configured to set a number N of observation points of the interference image for finding the unknown variables $I_1(j)$, $I_{20}(j)$, $k(j)$, and $t(i)$ to satisfy the following Formula (3):

$$N \geq 3m/(m-1) \quad (3),$$

where m represents a number of the wavelengths of the monochromatic lights, and N represents the number of the observation points of the interference image.

9. The film thickness measurement device according to claim 7, wherein
the electric controller is configured to set a number N of observation points of the interference image for finding the unknown variables $I_1(j)$, $I_{20}(j)$, $k(j)$, and $t(i)$ to satisfy the following Formula (3):

$$N \geq 3m/(m-1) \quad (3),$$

where m represents a number of the wavelengths of the monochromatic lights, and N represents the number of the observation points of the interference image.

10. The film thickness measurement device according to claim 2, wherein
the monochromatic lights are blue, green, and red monochromatic lights.

11. The film thickness measurement device according to claim 3, wherein
the monochromatic lights are blue, green, and red monochromatic lights.

12. The film thickness measurement device according to claim 4, wherein
the monochromatic lights are blue, green, and red monochromatic lights.

13. The film thickness measurement device according to claim 5, wherein
the monochromatic lights are blue, green, and red monochromatic lights.

14. The film thickness measurement device according to claim 7, wherein
the monochromatic lights are blue, green, and red monochromatic lights.

15. The film thickness measurement device according to claim 8, wherein
the monochromatic lights are blue, green, and red monochromatic lights.

16. The film thickness measurement device according to claim 9, wherein
the monochromatic lights are blue, green, and red monochromatic lights.

* * * * *